W. Mullee.
Making Hard Rubber.
Nº 76293.      Patented Mar. 31, 1868.

Attest
M. Stevens
Edmund Wetmore

William Mullee

UNITED STATES PATENT OFFICE.

WILLIAM MULLEE, OF CHESTERVILLE, ASSIGNOR TO MOSELEY EZEKIEL, OF PHILADELPHIA, PENNSYLVANIA.

IMPROVEMENT IN THE MANUFACTURE OF HARD RUBBER.

Specification forming part of Letters Patent No. 76,293, dated March 31, 1868.

*To all whom it may concern:*

Be it known that I, WILLIAM MULLEE, of Chesterville, in the township of Franklin, in the county of Chester, in the State of Pennsylvania, have invented a new and useful Improvement in the Preparation and Manufacture of Vulcanized India Rubber; and I do hereby declare that the following is a full, clear, and exact description of the said invention, reference being had to the accompanying drawings, and to the letters of reference marked thereon, making part of this specification.

My invention consists in a novel process of treating india-rubber, by means of which an article may be produced better and cheaper than any now known for the various purposes to which hard rubber is now applied.

The admixture of sulphur with india-rubber has long been known and used, both where the sulphur is mixed with the rubber mechanically and where the rubber is immersed in melted sulphur. Neither process is entirely successful in all cases.

To obviate some of the defects of former processes was the object of my invention secured by Letters Patent No. 62,055, dated February 12, 1867, by means of which I produced a compound free from cavities and blisters, more thoroughly vulcanized than that produced by the former processes, and better adapted for many manufacturing purposes, especially in the manufacture of jewelry and dental gum.

The object of my present invention is certain improvements in the process of my former invention of February 12, 1867, particularly in the method of drying the rubber, and in combining it with a larger proportion of sulphur, by means of which the compound is made more cheaply, and is as available for most manufacturing purposes as that made by the ordinary process in which rubber and not sulphur is the base of the compound.

To enable others skilled in the art of vulcanizing india-rubber to make, use, and practice my invention, I will describe the mode of procedure.

I first prepare the crude gum, in the usual manner, by washing, but do not subject it to any drying process, as is customary at this stage of the process in the ordinary methods of preparing rubber. I then roll it into sheets of about one-sixteenth of an inch in thickness. It is then of a dark color, and contains a percentage of aqueous and other foreign matter. Unless this matter is removed it is impossible for the rubber to combine with a large proportion of sulphur in the process of vulcanization, and, moreover, the aqueous humor forms sulphates, which have a deteriorating effect upon the compound.

Figure 3:
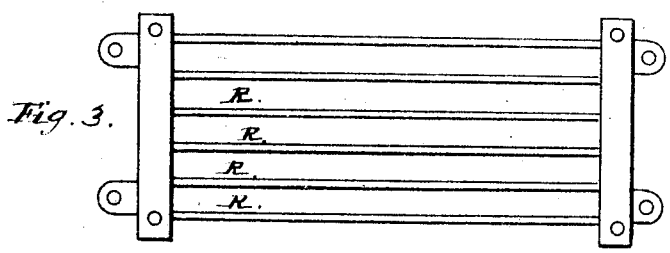

To obviate this, the rubber is usually dried by spreading it upon muslin tables after washing, under which heated tubes are passed—a process of several days' or even weeks' duration, and which only imperfectly accomplishes the object of drying the gum and expelling the aqueous matter. By my present mode after rolling I at once immerse the sheets in the sulphur-bath, heated to 220° Fahrenheit, in the same manner as described in the said patent of the 12th day of February, 1867, with the exception that the racks or frames R, Figure 3, are placed in the bath, so as to lie flat, and form horizontal layers, instead of resting on the edge, as before. The first sheet is sunk to the bottom of the bath, and the successive sheets between the racks placed one above the other horizontally until the bath is filled.

Figure 1:
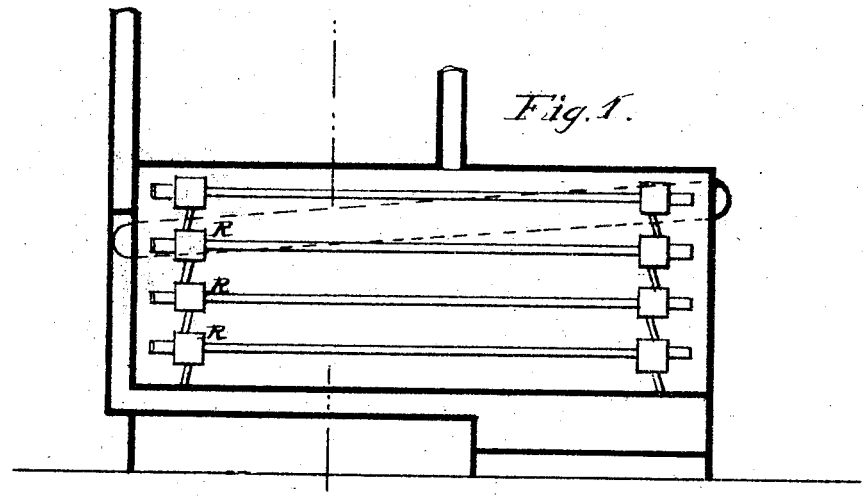

Fig. 1 is a lateral view of the bath with the racks R placed horizontally, as described.

Figure 2:
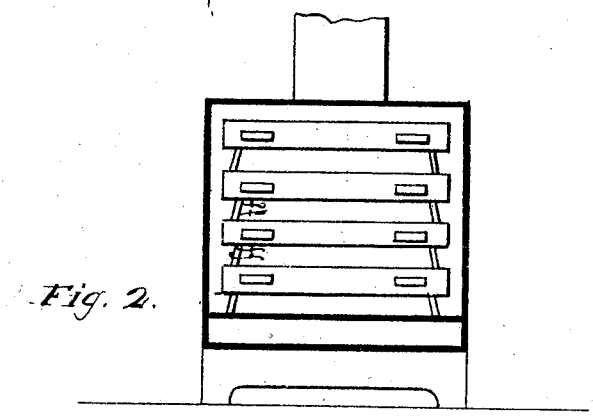

The racks are kept at a proper distance from each other by feet, as shown in Fig. 2, *f f*. The aqueous matter and other impurities are expelled and removed by the action and bleaching power of the heated sulphur, and rise to the surface in the shape of foam. The ceasing of the foam to rise is an indication that the sulphur has penetrated as far as is possible upon the first immersion. This is usually a period of twenty to thirty minutes, or, even if the foam has not wholly ceased at the end of that time, twenty or thirty minutes are sufficient for one immersion.

The surface of the rubber contracts when subjected to the heated sulphur, and after the time indicated is able to resist its further action. It is then necessary to remove the sheets and cleanse them by drawing them out with tongs, while a swab is passed over them twice or thrice to prevent crystallization. The sheets, when thoroughly cleaned, are then passed into an ordinary grinding or kneading mill, and kneaded until the mass is of the consistency of dough, when it is again rolled into sheets and subjected to the same process in the bath as before. When the foam ceases to rise on the second immersion, the sheets are removed, cleaned as before, and will be of a greenish color. The sheets should be weighed before their first immersion in the bath, and likewise upon their final removal, in order to ascertain the proportion of sulphur with which they have combined. The sheets are then combined with sulphur by the well-known process of passing them between heated rollers until the compound combines in the proportion of from seventeen to twenty-four ounces of sulphur to sixteen ounces of rubber. The mass at this stage of the process is not, as in the process described in the said invention of February 12, 1867, liable to become brittle, and no corrective for this is necessary, but it is plastic and will adhere to molds and metal plates more readily than when prepared by any other method.

The rubber is then rolled into any desired thickness by means of rollers, as described in the said patent of February 12, 1867, and placed between metal plates or molds, and the air expelled from between the compound and the metal by screw-pressure, passing between rollers or any suitable way.

The mass may be colored, if desired, at this stage, and different patterns may be given to the molding and impressed upon the rubber with great facility. The rubber between the plates or in the molds is then heated as follows: It is first heated to a pressure of from fifteen to twenty pounds to the square inch, and retained at that heat for about one hour. I find that at this temperature the sulphur fuses and the rubber calcines, and amalgamation begins to take place. A greater degree of heat volatilizes the sulphur and chars and burns the rubber, and this has been the great defect in former processes. At the expiration of the first hour the heat is raised to from thirty to forty pounds of pressure, and continued for a second hour, after which no injury can occur from over heating, and the heat may be allowed to rise even as high as seventy-five or eighty pounds for an hour and a half, or at most two hours, longer, when the rubber will be vulcanized and ready for use. The whole process thus set forth takes from five to ten hours, according to the quantity of rubber and sulphur treated, instead of several days, or even weeks, the time consumed by any process now known or used, including that occupied by the drying of the gum.

The sulphur which I employ in the process herein described should be that sort which has been treated with warm and cold water successively, and afterward with muriatic acid, and which is known to manufacturers as "pure sulphur."

The product of the process thus described has this peculiar advantage. It is composed of a very large proportion of sulphur, and yet has all the properties belonging to the ordinary compounds of hard rubber, which contain a much smaller proportion of sulphur and are much dearer than my compound.

By my process the stock, before vulcanization, owing to the treatment in the sulphur bath, which bleaches out the aqueous and oily matter, is plastic and sticky, and may be molded with great facility, and without the intervention of any further means to render it fit for this purpose. Nor does it blister or form cavities when heated in the course of its manufacture into various articles.

Besides the avoiding of these defects, the product of my process has certain novel and useful properties of its own, the impurities having been removed both from the rubber and the sulphur, and the combination of both these two ingredients being complete, the compound emits no unpleasant or offensive odor, and the tarnishing properties which characterize all other compounds of hard rubber are greatly diminished, if not entirely removed. It is more flexible and tougher than any compound of rubber and sulphur now known. Added to all these advantages it may be manufactured, by the process herein set forth, about forty per cent. cheaper than hard rubber made by any process yet used or discovered.

I do not claim the combining of rubber and sulphur, as that is old, nor do I claim, broadly, the formation of hard rubber, as a patent has been granted to Nelson Goodyear for that commodity, and other patents to different individuals for a similar purpose; but I believe I am the first to contrive a process by which hard rubber of a prime quality can be made by the use of a greater weight of sulphur than of rubber, which I combine in the proportion of from seventeen to twenty-four ounces of sulphur to one pound of rubber, by which means I produce a better article in proportion to its cost than has been ever before known.

I limit myself, therefore, to what is substantially my process for producing this result, which is as follows:

I first prepare the crude gum in the usual manner by washing. I then roll it into thin sheets and immerse them in a sulphur bath for about half an hour. To produce the best results these sheets should not exceed one-sixteenth of an inch in thickness, and the sulphur should be heated to about 220° Fahrenheit.

The sheets are then removed from the bath, cleansed, kneaded, re-rolled, and again immersed in the sulphur bath, then again cleansed, passed between heated rollers where the necessary amount of additional sulphur is added, all as above described.

It is then rolled of any desired thickness, subjected to pressure in order to expel the air it may contain, and then shaped into any desired form and subjected to the vulcanizing heat. It is essential that this should be of a comparatively low temperature at first for about an hour, and then raised gradually till the heat becomes that which is due to a steam-pressure of from seventy-five to eighty pounds to the square inch. An hour and a half or two hours at this latter temperature completes the vulcanization.

This process may be varied in same of its details without material detriment to the result, or without any departure from the principle of my invention. But I have obtained the best results in the manner above described.

What, therefore, I claim as my invention, and desire to secure by Letters Patent, is—

The above-described process of producing a prime article of hard rubber by combining rubber and sulphur as above described, and treating them substantially in the manner above set forth.

WILLIAM MULLEE.

Witnesses:
 A. E. STEVENS,
 EDMUND WETMORE.